V. W. BLANCHARD.
SELF-CLEARING RAKE.

No. 186,300. Patented Jan. 16, 1877.

WITNESSES
Henry N. Miller
C. L. Ewert

INVENTOR
V. W. Blanchard.
T. H. Alexander
ATTORNEY.

UNITED STATES PATENT OFFICE.

VIRGIL W. BLANCHARD, OF WEYBRIDGE, VERMONT.

IMPROVEMENT IN SELF-CLEANING RAKES.

Specification forming part of Letters Patent No. 186,300, dated January 16, 1877; application filed September 23, 1876.

*To all whom it may concern:*

Be it known that I, VIRGIL W. BLANCHARD, of Weybridge, in the county of Addison and State of Vermont, have invented certain new and useful Improvements in Automatic Self-Cleaning Rake; and that I do hereby declare that the following is a full, clear, and exact description thereof, reference being had to the accompanying drawing, and to the letters of reference marked thereon, which form part of this specification.

The nature of my invention consists in the construction and arrangement of an automatic self-cleaner for rakes, as will be hereinafter more fully set forth.

In order to enable others skilled in the art to which my invention appertains to make and use the same, I will now proceed to describe its construction and operation, referring to the annexed drawing, in which—

Figure 1:
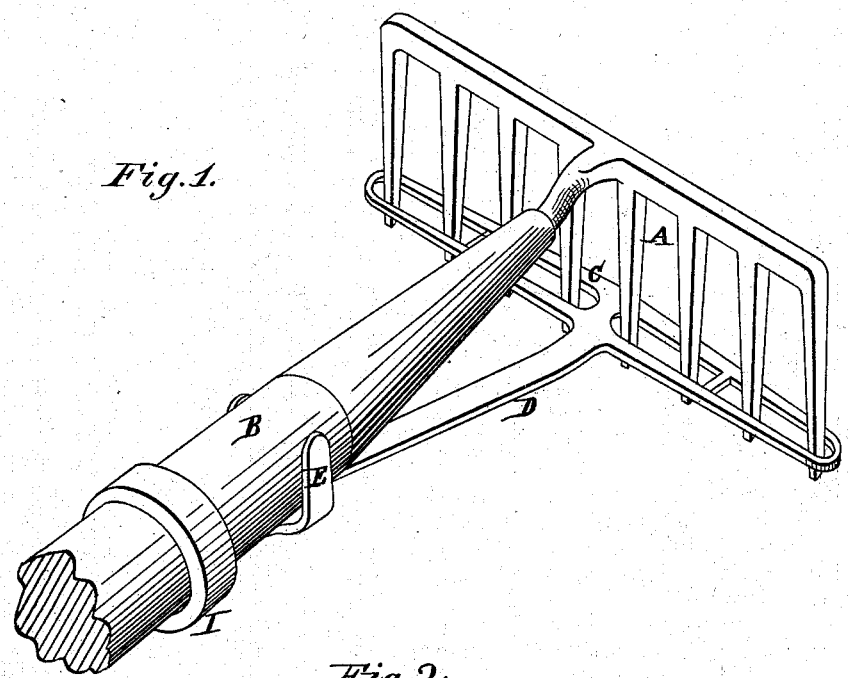
Figure 2:
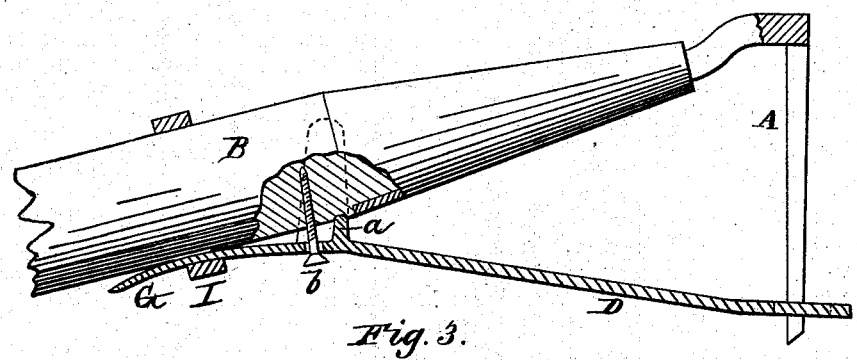
Figure 3:
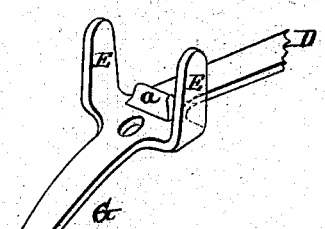

Figure 1 is a perspective view of my invention. Fig. 2 is a longitudinal section of the same. Fig. 3 is a detached view of a part thereof.

A represents an ordinary garden-rake, secured to a handle, B. C is the perforated cleaning-plate, through which the teeth of the rake pass, said plate being formed with a shank, D, having near its upper or outer end two side ears or guides, E E. Between these ears is a knife-edge or fulcrum, *a*, fitting in a notch or depression made in the handle B. The upper end of the shank D beyond the ears E forms a stem, G. In the shank, above the fulcrum *a*, is a perforation for the passage of a single screw, *b*, to attach the cleaner to the rake-handle. This perforation may be formed as the cleaning device is cast in the mold, without the expenditure of manual labor.

I represents an elastic band or spring, which performs a twofold purpose, as follows: When it is applied around the handle B and stem G, it serves to actuate the cleaning-plate C to clean the rake A; and when it is applied around the handle B and shank D, it serves to lift the cleaning-plate C up out of the way, near the base of the teeth of the rake A.

In the practical operation of my invention, the cleaning device, composed of the plate C, shank D, ears E, fulcrum or knife-edge *a*, and stem G, is attached to the rake-handle B by the single screw *b*, passing through the perforation in the shank into the handle. As the knife-edge *a* rests in a notch or depression in the handle, it is evident that the weight or gravity of the cleaning device, when the rake is lifted from the ground, will cause the cleaning-plate to fall and clean the teeth of the rake; and when the teeth of the rake are forcibly driven into the soil, in practical operation, the slight weight of said cleaning device, as it rises to the base of the teeth, is no impediment or obstacle to their proper action and effect.

By applying the elastic band I around the stem G and handle B, the cleaning-plate may be forcibly actuated in the process of cleaning the teeth of the rake. This spring is, however, not indispensable, but is only a valuable auxiliary.

By applying the band I around the shank D and handle B, the cleaning-plate may be raised and firmly held in position near the base of the teeth of the rake.

The ears or guides E serve to keep the shank D in a line with the handle B, and prevent friction between the cleaning-plate and the teeth of the rake. The notch in the handle for the fulcrum *a* serves as a kind of a socket to keep the same in place.

Having thus fully described my invention, what I claim as new, and desire to secure by Letters Patent, is—

1. In combination with a rake-handle and a cleaning device, a joint between them, composed of the ears or guides E E, fulcrum-edge *a*, and screw or rivet *b*, substantially as set forth.

2. A rake-cleaning device, formed of a single piece of cast metal, and consisting of the cleaning-plate C, shank D, with perforation, ears or guides E E, fulcrum-edge *a*, and stem G, substantially as and for the purposes set forth.

In testimony that I claim the foregoing as my own I hereby affix my signature in presence of two witnesses.

VIRGIL W. BLANCHARD.

Witnesses:
   THOS. H. MCLEOD,
   CATHRINE L. MCLEOD.